United States Patent
Ye

(10) Patent No.: US 9,191,868 B2
(45) Date of Patent: *Nov. 17, 2015

(54) METHOD OF TIMING REFERENCE MANAGEMENT

(71) Applicant: ACER INCORPORATED, New Taipei (TW)

(72) Inventor: Shiang-Rung Ye, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,323

(22) Filed: Sep. 2, 2014

(65) Prior Publication Data

US 2014/0369317 A1    Dec. 18, 2014

Related U.S. Application Data

(63) Continuation of application No. 13/745,868, filed on Jan. 21, 2013, now Pat. No. 8,879,518.

(60) Provisional application No. 61/596,236, filed on Feb. 8, 2012, provisional application No. 61/597,310, filed (Continued)

(51) Int. Cl.
*H04W 4/00* (2009.01)
*H04W 36/00* (2009.01)
(Continued)

(52) U.S. Cl.
CPC .......... *H04W 36/0072* (2013.01); *H04W 56/00* (2013.01); *H04W 56/001* (2013.01); *H04W 56/0045* (2013.01); *H04W 72/0406* (2013.01)

(58) Field of Classification Search
CPC .. H04W 72/04; H04W 56/00; H04W 36/0072

USPC ......................................... 370/331, 336, 350
See application file for complete search history.

(56) References Cited

U.S. PATENT DOCUMENTS 7,388,879 B2    6/2008    Sabe
7,848,346 B2   12/2010    Park (Continued)

FOREIGN PATENT DOCUMENTS

CN    101472345 A    7/2009
CN    101616443 A    12/2009

(Continued)

OTHER PUBLICATIONS

Catt, Timing Reference Change, 3GPP TSG RAN WG2 Meeting #77, R2-120252, Feb. 6-10, 2012, pp. 1-2, XP050565341, Dresden, Germany.

(Continued)

*Primary Examiner* — Sai-Ming Chan
(74) *Attorney, Agent, or Firm* — Winston Hsu; Scott Margo

(57) ABSTRACT

A method of timing reference management for a mobile device in a wireless communication system comprising a network is disclosed. The method comprises being configured a first cell of a timing advance group, as a timing reference cell of the timing advance group; and when the timing reference cell is changed from the first cell to a second cell of the timing advance group and a timing alignment timer applied for the timing advance group for uplink transmission synchronization is running, deriving a new uplink transmission timing according to a second timing adjust value; wherein the second timing adjust value is calculated according to a first downlink timing of the first cell, a second downlink timing of the second cell, and a first timing adjust value for deriving the uplink transmission timing when the timing reference cell is the first cell.

3 Claims, 3 Drawing Sheets

Related U.S. Application Data on Feb. 10, 2012, provisional application No. 61/615,032, filed on Mar. 23, 2012, provisional application No. 61/617,681, filed on Mar. 30, 2012, provisional application No. 61/635,868, filed on Apr. 20, 2012.

(51) Int. Cl.
  *H04W 72/04* (2009.01)
  *H04W 56/00* (2009.01)

(56) References Cited

U.S. PATENT DOCUMENTS

| | | |
|---|---|---|
| 8,204,041 B2 | 6/2012 | Britsch |
| 8,527,892 B2 | 9/2013 | Sirpal |
| 8,601,052 B2 | 12/2013 | Mir |
| 8,811,961 B2 | 8/2014 | Lee |
| 8,902,773 B2 | 12/2014 | Anderson |
| 8,908,560 B2 | 12/2014 | Maeda |
| 2005/0143119 A1 | 6/2005 | Chandra |
| 2008/0181127 A1 | 7/2008 | Terry |
| 2008/0273610 A1 | 11/2008 | Malladi |
| 2010/0184458 A1 | 7/2010 | Fodor |
| 2010/0240372 A1 | 9/2010 | Wu |
| 2011/0177816 A1 | 7/2011 | Hole |
| 2011/0194478 A1 | 8/2011 | Lee |
| 2011/0199910 A1 | 8/2011 | Oh |
| 2011/0274040 A1 | 11/2011 | Pani |
| 2012/0014371 A1* | 1/2012 | Weng et al. ............ 370/350 |
| 2012/0257513 A1 | 10/2012 | Yamada |
| 2013/0021993 A1 | 1/2013 | Chou |
| 2013/0114398 A1 | 5/2013 | Wang |
| 2013/0114577 A1* | 5/2013 | Cai et al. ............ 370/336 |
| 2013/0188582 A1 | 7/2013 | Dinan |
| 2013/0242851 A1 | 9/2013 | Dinan |
| 2013/0301591 A1 | 11/2013 | Meyer |
| 2014/0133337 A1 | 5/2014 | Lee |

FOREIGN PATENT DOCUMENTS

| | | |
|---|---|---|
| CN | 101682888 A | 3/2010 |
| CN | 102123425 A | 7/2011 |
| CN | 102271318 A | 12/2011 |
| EP | 1 915 010 A2 | 4/2008 |
| EP | 2 343 947 A1 | 7/2011 |
| TW | 201210237 | 3/2012 |
| WO | 2011063244 A2 | 5/2011 |
| WO | 2012154955 A1 | 11/2012 |
| WO | 2013051865 A2 | 4/2013 |
| WO | 2013119160 A1 | 8/2013 |

OTHER PUBLICATIONS

Huawei, Different Timing Advance Impact on Carrier Aggregation, 3GPP TSG RAN WG2 Meeting #67bis, R2-095815, Oct. 12-Oct. 16, 2009, pp. 1-3, XP050390299, Miyazaki, Japan.

New Postcom, Timing reference cell selection for TA group, 3GPP TSG RAN WG2 Meeting #76, R2-115739, Nov. 14-18, 2011, pp. 1-4, XP050564275, San Francisco, USA.

Renesas Mobile Europe, Multiple timing advance using multiple RACH, 3GPP TSG-RAN WG2 Meeting #74, R2-113014, May 9-13, 2011, XP050495152, Barcelona, Spain, pp. 1-3.

Interdigital Communications, Support for RACH on SCells in LTE CA, 3GPP TSG-RAN WG2 #74, Tdoc R2-113258, May 9-13, 2011, pp. 1-3, XP050495410, Barcelona, Spain.

Nokia Siemens Networks et al, Various correction to MAC, 3GPP TSG-RAN WG2 Meeting #66, R2-093447, May 5-8, 2009, XP050340531, San Francisco, USA.

Wang, "Methods and System for Reference Cell Maintenance", U.S. Appl. No. 61/556,298, filed Nov. 7, 2011, and claimed by US Publication No. 2013/0114398.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), 3GPP TS 36.300 V10.3.0 (Mar. 2011), Apr. 5, 2011, Cover page and p. 2, 72, 73.

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.4.0 (Dec. 2011), p. 33, 34, 39.

Alcatel-Lucent, "Multiple Timing Advances for Carrier Aggregation", 3GPP TSG-RAN WG4 Meeting #60bis, R4-115111, Zhuhai, China, Oct. 10-14, 2011, pp. 1-4.

Acer Incorporated, "Changing of DL Timing Reference", 3GPP TSG-RAN WG2 #77, R2-120229, Dresden, Germany, Feb. 6-10, 2012, p. 1.

* cited by examiner

METHOD OF TIMING REFERENCE MANAGEMENT

CROSS REFERENCE TO RELATED APPLICATIONS

This application is a continuation of U.S. application Ser. No. 13/745,868 filed on Jan. 21, 2013, which claims the benefit of provisional Application No. 61/596,236 filed on Feb. 8, 2012, provisional Application No. 61/617,681 filed on Mar. 30, 2013, provisional Application No. 61/635,868 filed on Apr. 20, 2012, provisional Application No. 61/597,310 filed on Feb. 10, 2012, and provisional Application No. 61/615,032 filed on Mar. 23, 2012.

BACKGROUND OF THE INVENTION

1. Field of the Invention

The application relates to a method utilized in a wireless communication system, and more particularly, to a method of timing reference management in a wireless communication system.

2. Description of the Prior Art

Toward advanced high-speed wireless communication system, such as transmitting data in a higher peak data rate, LTE-Advanced system is standardized by the 3rd Generation Partnership Project (3GPP) as an enhancement of Long-Term Evolution (LTE) system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where a user equipment (UE) can establish multiple links corresponding to the multiple component carriers for simultaneously receiving and transmitting. In carrier aggregation, the UE only has one radio resource control (RRC) connection with the network. At RRC connection establishment/re-establishment/handover, one serving cell provides the Non-Access Stratum (NAS) mobility information, and at RRC connection re-establishment/handover, one serving cell provides the security input. This cell is referred to as a primary cell (PCell). In the downlink, the component carrier corresponding to the PCell is the Downlink Primary Component Carrier (DL PCC) while in the uplink it is the Uplink Primary Component Carrier (UL PCC). In addition, cells other than the PCell are named secondary cell (SCell).

Since the UE may not need to use all of the configured cells (i.e. PCell and one or more SCells), only some SCells are activated, so as to save UE power. Note that, the PCell is always activated. Generally, an evolved Node-B (eNB) activates or deactivates a SCell by sending a signalling (e.g. a medium access control control element (MAC CE), or Activation/Deactivation command) to the UE. In addition, the UE starts a deactivation timer for a SCell when the SCell is activated, wherein the SCell is deactivated when the deactivation timer expires. In other words, the deactivation timer provides a period of time for SCell activation. Please note that, when the SCell is deactivated, the UE does not need to monitor physical downlink control channel (PDCCH) of the deactivated SCell. Further, the UE shall not transmit on UL-SCH on the deactivated SCell.

As abovementioned, it is possible to configure a UE of a PCell and one SCell or more SCells. Therefore, multiple timing advance values, each for synchronization with a serving eNB on uplink timing for preventing signals transmitted from the UE from colliding with those sent from other UEs under the coverage of the eNB, are needed for PCell and SCell or more SCells. Note that, serving cells having uplink to which the same timing advance value applies are grouped in a timing advance group (TAG). Each TAG contains at least one serving cell with configured UL, and the mapping of each serving cell to a TAG is configured by the serving eNB. In order to realize uplink timing alignment, the UE maintains a time alignment timer (TAT) whose running state indicates that uplink transmission is still synchronized. TAT may be applied for a TAG.

In carrier aggregation, a UE may apply information (i.e. parameter settings) to one cell by referring to the information observed from other cell, which is called reference cell in this disclosure. For example, the reference cell may be a timing reference cell. For the timing reference cell, if a UE uses the downlink timing of Cell #x as the timing reference for the Cell #y to derive an uplink transmission timing, then call Cell #x is the timing reference cell of the Cell #y.

Applicant notices a problem associated to timing reference cell change. Although the uplink transmission timing is the same for all cells in a TAG, the downlink timing for each cell in the TAG may be different. A timing reference cell of the TAG whose downlink timing is used to derive the common uplink transmission timing is introduced in the LTE-Advanced system. Based on specification of the LTE-Advanced system, the uplink transmission timing is a downlink timing of the timing reference cell plus an integer value, called timing adjust value $N_{TA}$. The eNB transmits a timing advance command (TAC) to the UE to adjust the timing adjust value $N_{TA}$. The TAC includes an integer which is a positive or negative integer to indicate the UE to advance or slow the current uplink timing for the amount of the value. The abovementioned TAT is further used for determining whether timing adjust value $N_{TA}$ is still valid for the UE to derived uplink transmission timing. When the TAT expires, the UE considers timing adjust value $N_{TA}$ is invalid, so there is no uplink transmission timing available.

Note that, in the LTE-Advanced system, it requires that cells in a TAG must have downlink timing difference smaller than 1 step of timing adjust value $N_{TA}$, so as to avoid timing jump problem, which may impact data decoding in the UE. However, specification of the LTE-Advanced system does not specify how to set timing adjust value $N_{TA}$ when timing reference cell changes from a cell to another. Thus, the UE may not derive correct uplink transmission timing.

SUMMARY OF THE INVENTION

The application discloses a method of timing reference management in a wireless communication system in order to solve the abovementioned problems.

A method of timing reference management for a mobile device in a wireless communication system comprising a network is disclosed. The method comprises being configured a first cell of a timing advance group, in which cells have the same uplink timing, as a timing reference cell of the timing advance group, wherein the downlink timing of the timing reference cell is used for deriving the uplink transmission timing, and when the timing reference cell is changed from the first cell to a second cell of the timing advance group and a timing alignment timer applied for the timing advance group for uplink transmission synchronization is running, deriving a new uplink transmission timing according to a second timing adjust value, wherein the second timing adjust value is calculated according to a first downlink timing of the first cell, a second downlink timing of the second cell, and a first timing adjust value for deriving the uplink transmission timing when the timing reference cell is the first cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
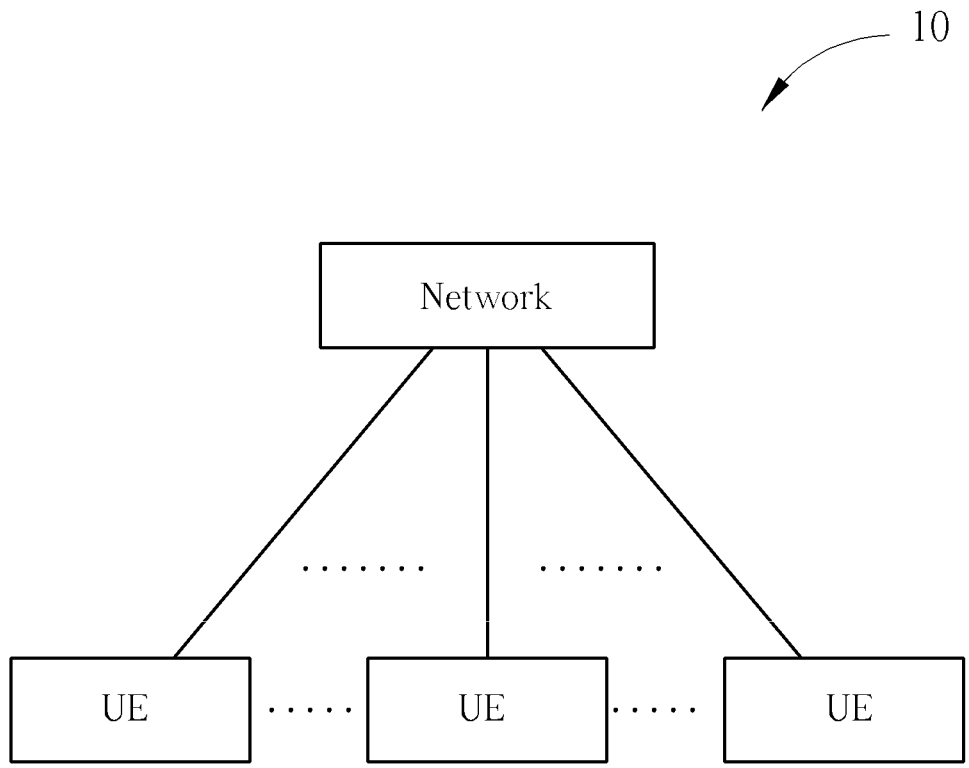
FIG. 1 illustrates a schematic diagram of an exemplary wireless communication system.

Please refer to FIG. 1, which is a schematic diagram of a wireless communication system 10. The wireless communication system 10 is a Long-Term Evolution advanced (LTE-Advanced) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, a camera, a television, a hand-held video game device, a musical device, a wireless sensor, etc. In some applications, a UE may be a fixed computing device operating in a mobile environment, such as a bus, a train, an airplane, a boat, a car, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
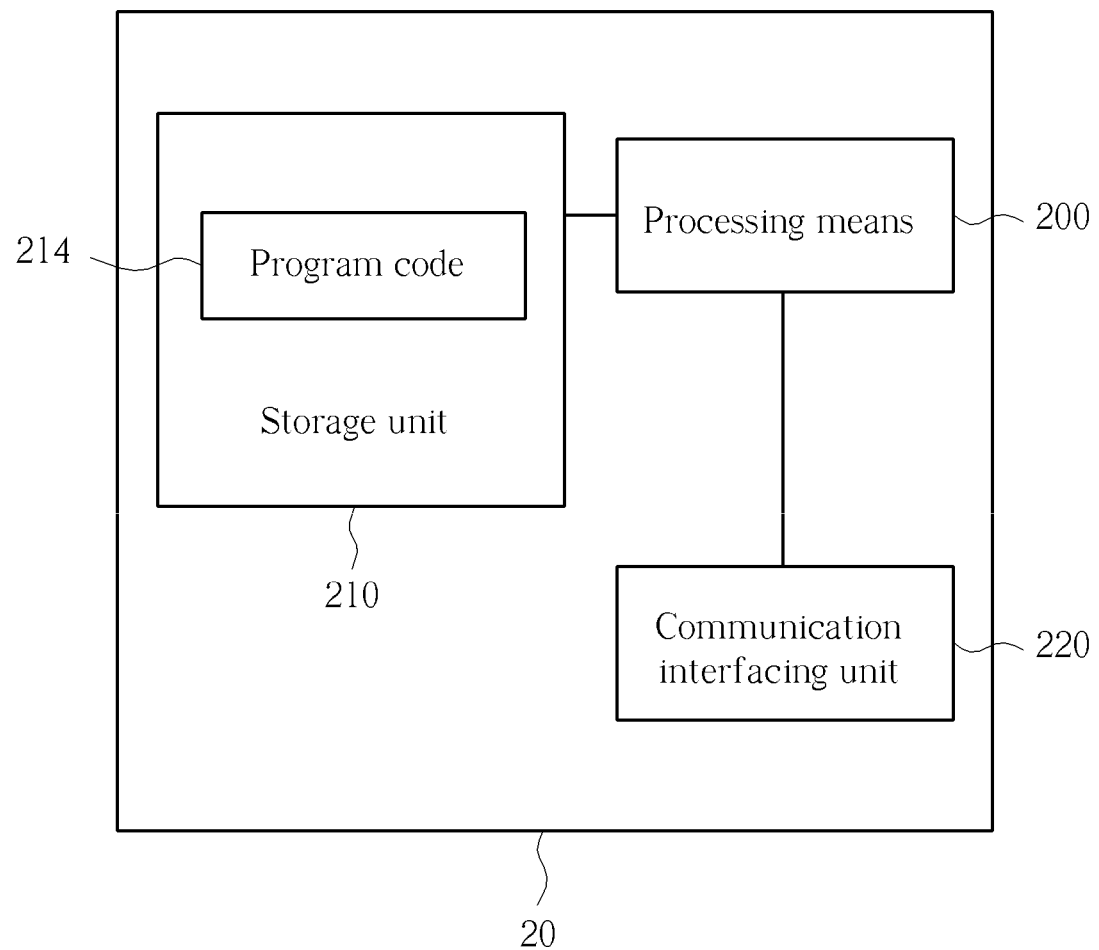
FIG. 2 illustrates a schematic diagram of an exemplary communication device.

FIG. 2 illustrates a schematic diagram of an exemplary communication device 20. The communication device 20 can be the UE shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network (i.e. PCell or SCell1-SCellN) according to processing results of the processing means 200.

Figure 3:
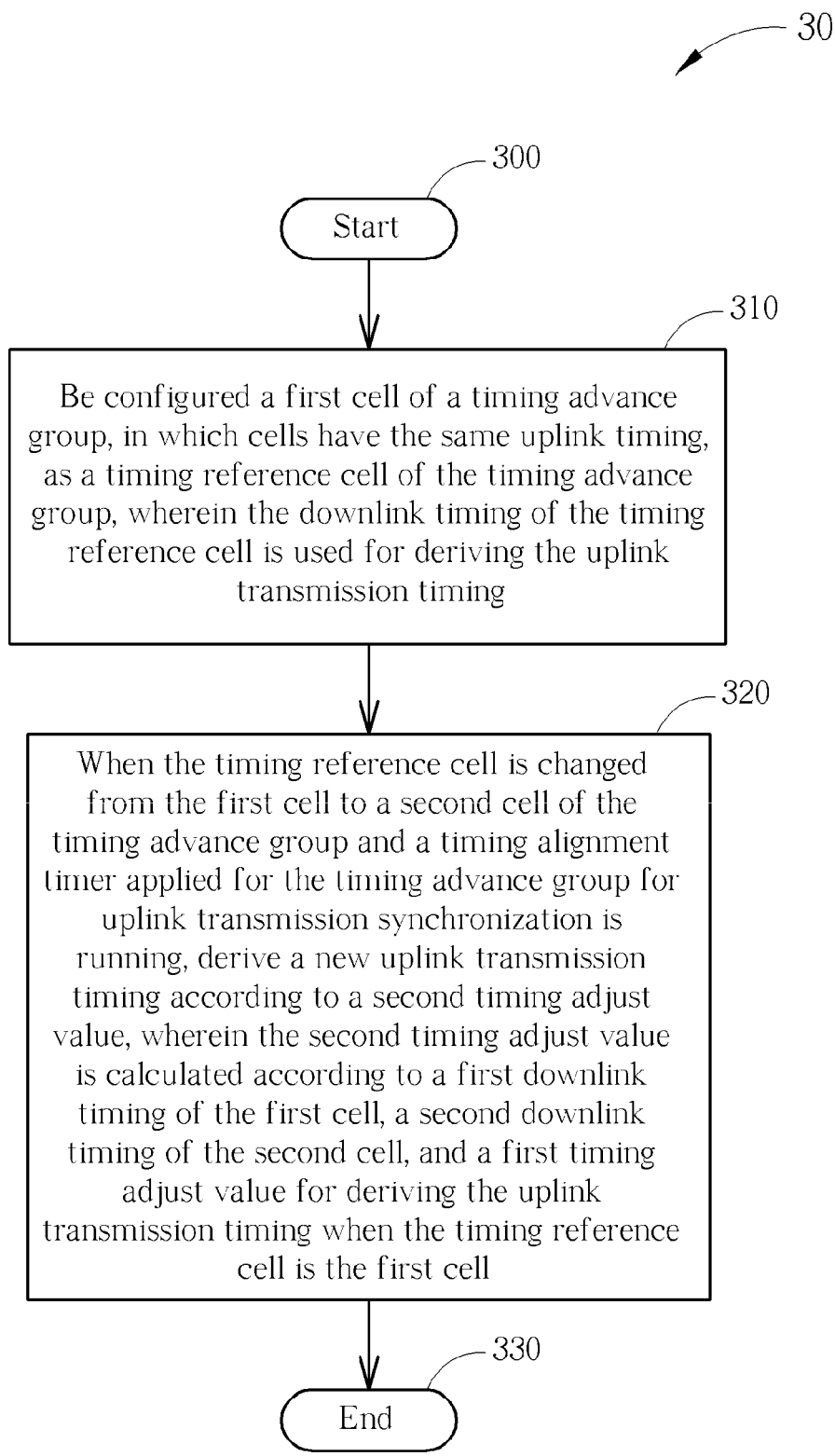
FIG. 3 is a flowchart of an exemplary process.

Please refer to FIG. 3, which illustrates a flowchart of an exemplary process 30. The process 30 is utilized in the UE for timing reference management. The process 30 can be compiled into the program code 214 and includes the following steps:

Step 300: Start.

Step 310: Be configured a first cell of a timing advance group, in which cells have the same uplink timing, as a timing reference cell of the timing advance group, wherein the downlink timing of the timing reference cell is used for deriving the uplink transmission timing.

Step 320: When the timing reference cell is changed from the first cell to a second cell of the timing advance group and a timing alignment timer applied for the timing advance group for uplink transmission synchronization is running, derive a new uplink transmission timing according to a second timing adjust value, wherein the second timing adjust value is calculated according to a first downlink timing of the first cell, a second downlink timing of the second cell, and a first timing adjust value for deriving the uplink transmission timing when the timing reference cell is the first cell.

Step 330: End.

According to the process 30, when the downlink timing reference is changed from the first downlink timing of the first cell to the second downlink timing of the second cell, and the timing alignment timer is still running (namely uplink transmission synchronization), the UE can derive a new uplink transmission timing without assistance from the network. The UE calculates the second timing adjust value according to the first downlink timing of the first cell, the second downlink timing of the second cell, and the first timing adjust value, which have been known by the UE. Thus, even the UE cannot get a timing advance command (TAC) including a new timing adjust value from eNB, the UE still can get the new uplink transmission timing.

In an embodiment, the second timing adjust value is configured by the network according to the equation:

$$N_{TA, B} = R_A + N_{TA, A} - R_B,$$

where $N_{TA, B}$ is the second timing adjust value, $R_A$ is the first downlink timing of the first cell, $N_{TA, A}$ is the first timing adjust value, and $R_B$ is the second downlink timing of the second cell.

After deriving the second timing adjust value, the UE knows the new uplink transmission timing is a downlink timing of the second cell plus the second timing adjust value. In addition, the UE adjusts from the original uplink transmission timing associated to the first cell to the new uplink transmission timing associated to the second cell gradually or at once.

Note that, a UE is not allowed to change timing reference cell arbitrarily. However, the UE can change the timing reference cell when the following events happen:

1. Timing reference cell is deactivated by a deactivation timer, i.e. deactivation timer expires, or deactivated by the eNB.
2. Timing reference cell is released or/and reconfigured.
3. UE cannot synchronize downlink timing with the eNB.
4. eNB moves the current timing reference cell to other timing advance group.

In an embodiment, when the timing reference cell is out of synchronized with eNB, the eNB sends a message to the UE to deactivate, release or reconfigure the timing reference cell. When the UE receives the message, the UE MAC selects a new timing reference cell and change to it. In other embodiment, when the timing reference cell is deactivated by the UE RRC or UE MAC, i.e. due to expiry of the deactivation timer, the UE MAC selects a new timing reference cell and change to it.

Note that, the UE is not allowed to select a cell as a timing reference cell arbitrarily. Some rules are defined for the timing reference cell selection. In an embodiment, the UE selects a cell of a timing advance group as a timing reference cell with the best radio channel quality. In other words, the cell with best radio channel quality has highest priority to be selected as a timing reference cell. In other embodiment, the UE selects a cell of a timing advance group as a timing reference cell by taking remaining time to expiry of the deactivation timer into consideration. For example, the longer the remaining time is, the higher priority to be selected to be a timing reference cell.

In addition, a new medium access control control element (MAC CE) is introduced to be used to report the new timing reference cell. When there are padding bytes, MAC uses padding bytes to report the new timing reference cell. The MAC CE may include a identifier of a timing advance group for identifying the timing advance group where timing reference is changed, and/or a cause of timing reference cell change for indicating why UE changes timing reference.

Moreover, in order to prevent frequent change of timing reference cell, a prohibit timer is proposed in this article. In detail, after the timing reference cell is changed by the UE or the eNB, the UE starts the prohibit timer. Before the prohibit timer expires, the UE cannot change the timing reference cell autonomously. On the other hand, after the prohibit timer expires, the UE can select a cell to be the new timing reference cell and change to it.

In conclusion, the present invention provides methods for timing reference management for deriving uplink transmission timing in timing reference cell change.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of timing reference management for a mobile device in a wireless communication system comprising a network, the method comprising:

being configured as a first cell of a timing advance group, in which cells have the same uplink timing, as a timing reference cell of the timing advance group, wherein a downlink timing of the timing reference cell is used for deriving an uplink transmission timing; and when the timing reference cell is changed from the first cell to a second cell of the timing advance group and a timing alignment timer applied for the timing advance group for uplink transmission synchronization is running, deriving a new uplink transmission timing according to a second downlink timing of the second cell;

adjusting from the uplink transmission timing associated to the first cell to the new uplink transmission timing associated to the second cell.

2. The method of claim 1, wherein the adjusting step comprises:

adjusting from the uplink transmission timing associated to the first cell to the new uplink transmission timing associated to the second cell at once.

3. The method of claim 1, wherein the adjusting step comprises:

adjusting from the uplink transmission timing associated to the first cell to the new uplink transmission timing associated to the second cell gradually.

* * * * *